Aug. 2, 1955          D. S. BROWN          2,714,516
LIQUID TRANSPORTING TANKS
Original Filed Oct. 14, 1948          2 Sheets-Sheet 1
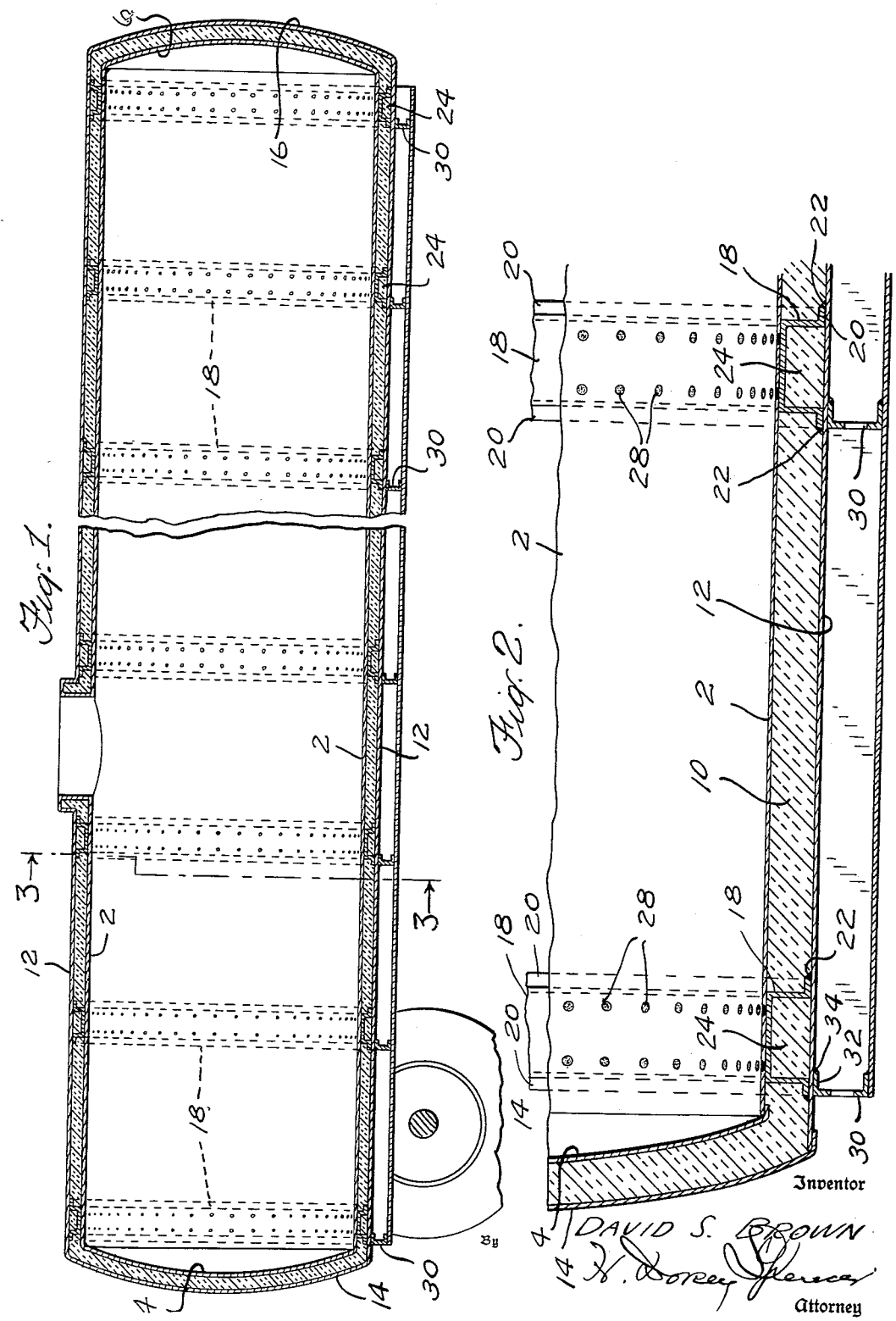
Inventor
DAVID S. BROWN
Attorney Aug. 2, 1955  D. S. BROWN  2,714,516
LIQUID TRANSPORTING TANKS
Original Filed Oct. 14, 1948  2 Sheets-Sheet 2
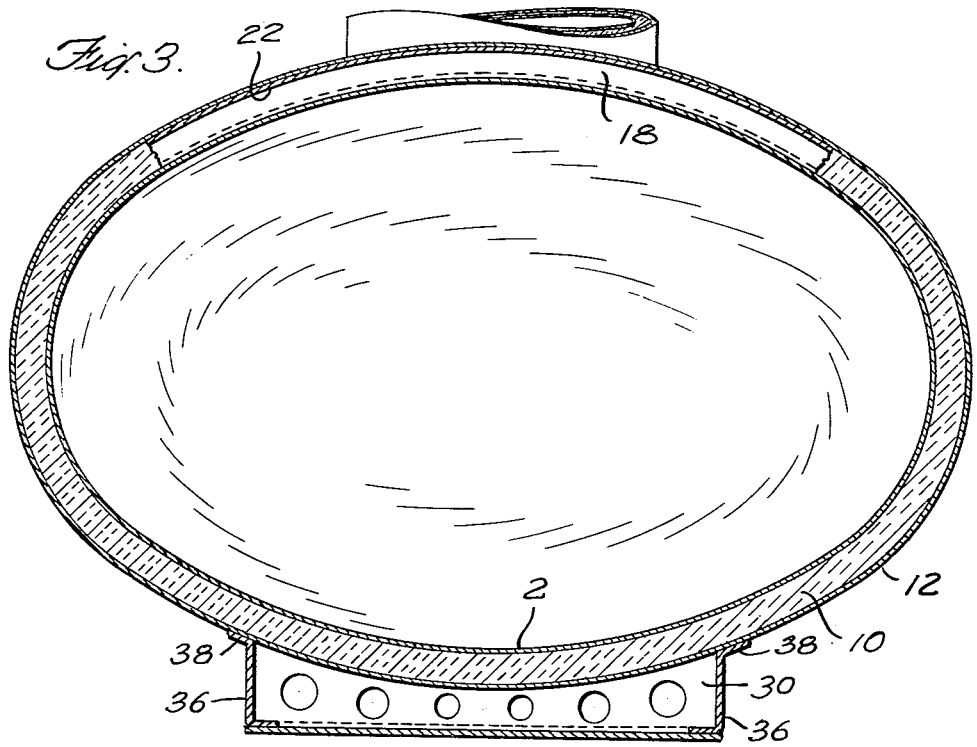
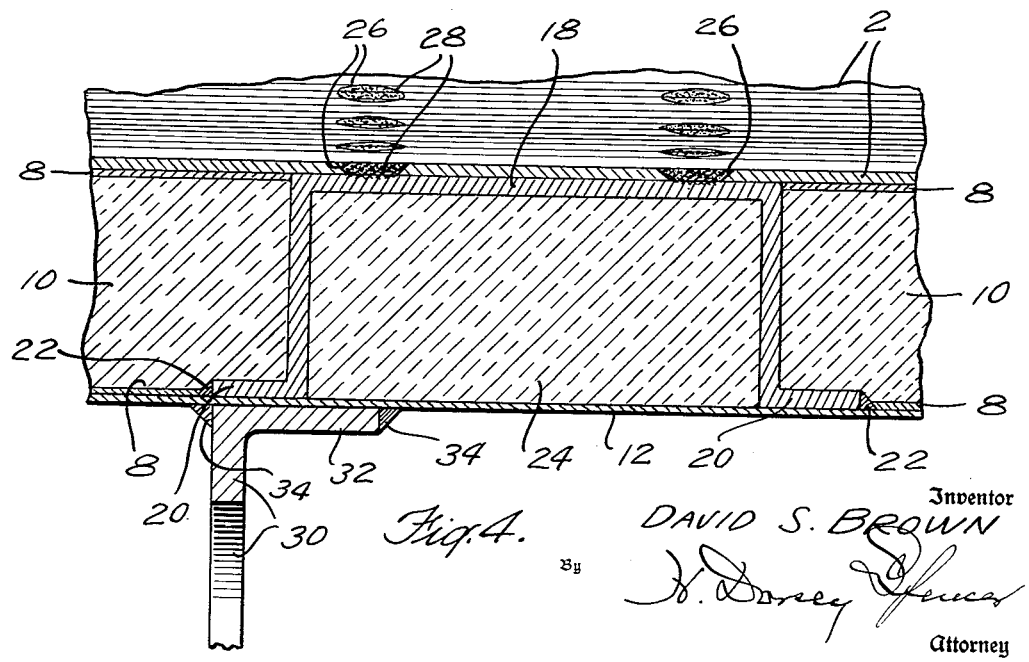
Inventor
DAVID S. BROWN
By
Attorney

United States Patent Office 2,714,516
Patented Aug. 2, 1955

2,714,516

LIQUID TRANSPORTING TANKS

David S. Brown, Fanwood, N. J.

Continuation of application Serial No. 54,376, October 14, 1948. This application February 3, 1955, Serial No. 485,981

9 Claims. (Cl. 280—5)

This invention relates to portable tanks in which fluids, such, for example, as milk, are transported over highways or railroads and a general object of the invention is so to improve the construction of such tanks, particularly those designed to carry perishable products such as milk, that the "pay load" proportion of the overall weight of the transported tank and contents will be increased. This application is a continuation of my copending application Serial No. 54,376 filed October 14, 1948, now abandoned.

Because of increasing labor costs and the low maximum weights permitted on the highways of various States, the cost of shipping fluid products, such, for example, as milk, in over-the-road equipment has become a considerable part of the cost of the delivered product. A particular object of the present invention, therefore, is so to redesign the construction of tanks, particularly insulated tanks such as are used in transporting milk over highways or railroads, that the weight of the tank may be very materially reduced without reducing its structural strength or its insulating efficiency, whereby the amount of "pay load," that is, the amount of fluid carried at the same labor cost and with the same overall weight of tank and contents, may be materially increased.

In all conventional insulated liquid carrying tanks now in use the inside tank structure is the weight-carrying part of the total structure. The outside jacket is merely a covering for holding and protecting the insulation which surrounds the inside liquid-holding tank.

I have discovered that, by taking advantage of the structural characteristics of certain forms of insulation which are now upon the market, a tank construction may be produced, which is of substantially the same structural strength as existing tanks and of greatly reduced weight, by making the inner and outer walls of the tank and the insulation in the form of a substantially integral structure so that both of the tank walls and the insulation therebetween constitute functional parts of the weight-carrying structure of the tank.

With the foregoing and other objects in view the invention is herein shown as embodied in a tank in which relatively light layers of suitable sheet metal are cemented to the two sides of a lightweight insulating core material which is of sufficient inherent structural strength to produce a resultant section of I-beam type. Effective adhesives or cements have been developed in recent years which will so secure the metal to the insulation as to produce substantially an integral structure, so that the weight of the tank contents is carried by the structure as a whole and reliance is not placed, as at present, only upon the weight supporting and distortion resisting strength of that wall with which the liquid comes into contact.

In the accompanying drawing:

Figure 1 is a longitudinal sectional view through a tank, intended primarily for the transportation of perishable liquids, such as milk, over highways or railroads, in which the present invention has been embodied.

Fig. 2 is an enlarged sectional detail of a portion of the tank shown in Fig. 1.

Fig. 3 is a transverse section on the line 3—3 of Fig. 1; and

Fig. 4 is a further enlarged, sectional detail of one of the reinforcing ribs and the frame support therefor, this view showing particularly the connections between the parts.

In the illustrative embodiment of the invention, the inner cylindrical wall 2 and the inner end walls 4 and 6 of the tank, may be made of a relatively thin layer of stainless steel or metal of equivalent utility for the purpose, effectively secured or bonded by any suitable adhesive 8, such, for example, as a cement manufactured by the Minnesota Mining & Mfg. Co., and designated E. C. 524, to a core 10 of insulating material having considerable inherent structural strength, such, for example, as the material sold under the trade name of "Rubatex." Hot asphalt may also be used to bond the metal and insulation layers together. If stainless steel be used for the inner wall 2 and end walls 4 and 6 of the tank, it may be of a thinness of 18 gauge for a tank of average capacity, say 3500 gallons. The outer wall 12 of the elliptical main body of the tank and the end walls 14 and 16 may be made of the same material and of the same gauge of material as the inner wall 2, or these walls may be made of other suitable lightweight material, likewise effectively secured to the core 10 of insulation by any suitable cement 8 so that the composite structure, comprising the two metal walls and the insulating core, forms a substantially integral structural member sufficiently strong to support the weight of the liquid in the tank and to withstand the stresses to which it is subjected in transportation over highways or railroads.

As shown particularly in Fig. 3, the tank may be of the usual elliptical section, although the particular sectional shape of the tank is not an essential feature of the invention. Preferably stress rings 18, shaped to help maintain the section of the tank and securely fastened to both the inner shell 2 and the outer shell 12, are provided, these rings being in the form of laterally flanged channels, as shown more particularly in Figs. 2 and 4. The flanges 20 of the stress rings 18 may be secured to the outer shell 12 of the main body of the tank by welding thereto as shown at 22 before the insulating core 10 is placed therein. Preferably each channel is also filled with like insulation as shown at 24. The inner shell 2 of the main body of the tank is preferably provided with countersunk openings 26 through which rivets 28 may be spot-welded to the bottoms of the channel rings 18, thus firmly attaching the inner shell 2 to these rings. The tank as a whole may be supported on suitable transverse supports such as the channels 30 having their upper flanges 32 welded to the outer shell 12, as shown at 34, or otherwise secured thereto.

As above suggested, in one embodiment of the invention the inner and outer shells 2 and 12 may be made of stainless steel, or the outer shell 12 may be made of lightweight metal, such as aluminum or magnesium, of a considerably heavier gauge, in which case the structural strength might be so increased without increase of weight, as to permit the elimination of the stress rings 18. Further structural strength might also be obtained by interposing between either one or both of the metal layers and the core of insulation 10, a layer of plywood, thoroughly bonded both to the core 10 and the metal shell.

From an inspection of the drawings, it will be seen that the transverse supports 30 extend between reach bars 36 and that the reach bars 36 extend substantially from end to end of the tank. Therefore, the substantially integral structural member which constitutes the improved tank construction and which in itself is strong enough to resist deformation between its ends, these tanks being normally supported near their ends over the vehicular wheels, has also the advantage of additional support substantially throughout its length on the continuous reach bars 36.

It will further be noted that the flanges 38 of the reach bars 36 are shaped to conform substantially to the surface of the jacket 12 with which they contact, thus providing additional support for the tank.

From the foregoing description it will be seen that the present invention makes possible the provision of a portable tank for transmitting liquids, such as milk, over highways and railways which, for the same capacity, may be made of considerably lighter weight without any loss of weight-carrying strength or structural resistance to the stresses to which it is subjected while being transported over highways or railways. In fact, the invention has made possible the provision of a tank of equivalent capacity which not only is of lighter weight, but in most cases is of considerably increased weight-carrying strength and has considerably increased resistance to distortion due to the stresses incident to transportation over the highways and railways.

Having thus described the invention what is claimed as new and desired to be secured by Letters Patent is:

1. In a tank truck or trailer for use in transporting perishable liquids over highways and in which an elongated tank is designed for support near its ends over the vehicular wheels, the combination with laterally spaced reach bars extending approximately from end to end of said tank, of a tank comprising an inner liquid container of suitable corrosion-resisting metal and an outer metal jacket, too thin to constitute weight-carrying structural elements in themselves, and a layer of insulating material of substantial inherent structural strength located between and so intimately bonded to the metal layers that the three layers form a substantially integral weight-supporting and stress resisting means, the elongated body of said tank being of curved section and having between the container wall and the jacket stress rings located at intervals along the length of the tank and so securely bonded to the container jacket as also to form reinforcing parts of the substantially integral weight-supporting and stress-resisting structural means, transverse contour-fitting cross supports being secured to the outside of said jacket opposite the stress rings, said cross supports extending between and being secured to the reach bars.

2. A tank truck or trailer according to claim 1 in which the stress rings are also secured to the inner container.

3. A tank truck or trailer according to claim 1 in which the reach bars are provided with contour-fitting flanges engaging the under side of the tank jacket.

4. A double-walled transport tank having the proximal faces of the walls thereof intimately joined throughout as a unit, whereby when the same is mounted on a wheeled vehicle by connecting its outer surface to the vehicle chassis, localization of stresses, with resulting fatigue, crystallization and cracking, is prevented, said tank including an elongated, outer, tubular wall; an elongated, inner, tubular wall telescoped within the outer wall and having a lesser diameter than the outer wall, presenting a space between the walls surrounding the inner wall, the longitudinal axes of the walls being horizontal, said walls being too light to withstand the structural loads to which the tank is normally subjected; means closing the ends of said walls; and a core of lightweight insulating material of high compressive strength within said space surrounding the inner wall, said core having opposed surfaces engaging and rigidly joined throughout with proximal faces of both walls; presenting a substantially integral weight-supporting and stress-resisting means.

5. A double-walled transport tank having the proximal faces of the walls thereof intimately joined throughout as a unit, whereby when the same is mounted on a wheeled vehicle by connecting its outer surface to the vehicle chassis, localization of stresses, with resulting fatigue, crystallization and cracking, is prevented, said tank including an elongated, outer, tubular wall; an elongated, inner, tubular wall telescoped within the outer wall and having a lesser diameter than the outer wall, presenting a space between the walls surrounding the inner wall, the longitudinal axes of the walls being horizontal, said walls being too light to withstand the structural loads to which the tank is normally subjected; means closing the ends of said walls; a plurality of arcuate, spaced stress members underlying the inner wall within said space; and a core of lightweight insulating material of high compressive strength within said space surrounding the inner wall between said stress members, said core having opposed surfaces engaging and rigidly joined throughout with proximal faces of both walls, presenting a substantially integral weight-supporting and stress-resisting means.

6. A double-walled transport tank having the proximal faces of the walls thereof intimately joined throughout as a unit, whereby when the same is mounted on a wheeled vehicle by connecting its outer surface to the vehicle chassis, localization of stresses, with resulting fatigue, crystallization and cracking, is prevented, said tank including an elongated, outer, tubular wall; an elongated, inner, tubular wall telescoped within the outer wall and having a lesser diameter than the outer wall, presenting a space between the walls surrounding the inner wall, the longitudinal axes of the walls being horizontal, said walls being too light to withstand the structural loads to which the tank is normally subjected; means closing the ends of said walls; a plurality of stress rings surrounding the inner wall within said space; means rigidly securing said rings to at least one of said walls; and a core of light-weight insulating material of high compressive strength within said space surrounding the inner wall between said rings, said core having opposed surfaces engaging and rigidly joined throughout with proximal faces of both walls, presenting a substantially integral weight-supporting and stress-resisting means.

7. A double-walled transport tank having the proximal faces of the walls thereof intimately joined throughout as a unit, whereby when the same is mounted on a wheeled vehicle by connecting its outer surface to the vehicle chassis, localization of stresses, with resulting fatigue, crystallization and cracking, is prevented, said tank including an elongated, outer, tubular wall; an elongated, inner, tubular wall telescoped within the outer wall and having a lesser diameter than the outer wall, presenting a space between the walls surrounding the inner wall, the longitudinal axes of the walls being horizontal, said walls being too light to withstand the structural loads to which the tank is normally subjected; means closing the ends of said walls; a plurality of stress rings surrounding the inner wall within said space; means rigidly securing said rings to at least one of said walls; a core of light-weight insulating material of high compressive strength within said space surrounding the inner wall between said rings, said core having opposed surfaces engaging and rigidly joined throughout with proximal faces of both walls; and means for bonding said surfaces of the core to said walls, presenting a substantially integral weight-supporting and stress-resisting means.

8. A double-walled transport tank having the proximal faces of the walls thereof intimately joined throughout as a unit, whereby when the same is mounted on a wheeled vehicle by connecting its outer surface to the vehicle chassis, localization of stresses, with resulting fatigue, crystallization and cracking, is prevented, said tank including an elongated, outer, tubular wall; an elongated, inner, tubular wall telescoped within the outer wall and having a lesser diameter than the outer wall, presenting a space between the walls surrounding the inner wall, the longitudinal axes of the walls being horizontal, said walls being too light to withstand the structural loads to which that tank is normally subjected; means closing the ends of said walls; a plurality of stress rings surrounding the inner wall within said space, said rings engaging both walls; weld means rigidly securing said rings to both of said walls; and a core of lightweight insulating material of high compressive strength within said space surrounding the inner wall between said rings and engaging the latter, said core having opposed surfaces engaging and rigidly joined throughout with proximal faces of both walls, presenting a substantially integral weight-supporting and stress-resisting means.

9. A double-walled milk tank having the proximal faces of the walls thereof intimately joined throughout as a unit, whereby when the same is mounted on a wheeled vehicle by connecting its outer surface to the vehicle chassis, localization of stresses, with resulting fatigue, crystallization and cracking, is prevented, said tank including an elongated, outer, tubular wall; an elongated, inner, tubular wall telescoped within the outer wall and having a lesser diameter than the outer wall, presenting a space between the walls surrounding the inner wall, the longitudinal axes of the walls being horizontal, said walls being too light to withstand the structural loads to which the tank is normally subjected; means closing the ends of said walls; a plurality of stress rings surrounding the inner wall within said space, said rings engaging both walls; weld means rigidly securing said rings to both of said walls; a core of lightweight insulating material of high compressive strength within said space surrounding the inner wall between said rings and engaging the latter, said core having opposed surfaces engaging and rigidly joined throughout with proximal faces of both walls; and adhesive means cementing said surfaces of the core to both walls, presenting a substantially integral weight-supporting and stress-resist-means.

References Cited in the file of this patent

UNITED STATES PATENTS

| | | |
|---|---|---|
| 1,908,684 | Buchanan | May 16, 1933 |
| 2,059,801 | Lindsay | Nov. 3, 1936 |
| 2,160,477 | Kramer | May 30, 1939 |
| 2,626,813 | Mullen | Jan. 27, 1952 |